United States Patent
Ballantyne

(10) Patent No.: US 7,969,908 B2
(45) Date of Patent: Jun. 28, 2011

(54) CONNECTIVITY OUTAGE DETECTION BASED ON A MULTICAST MANAGEMENT MPLS-VPN GROUP

(75) Inventor: Andrew John Ballantyne, San Francisco, CA (US)

(73) Assignee: Cisco Technology, Inc., San Jose, CA (US)

( * ) Notice: Subject to any disclaimer, the term of this patent is extended or adjusted under 35 U.S.C. 154(b) by 477 days.

(21) Appl. No.: 11/549,905

(22) Filed: Oct. 16, 2006

(65) Prior Publication Data
US 2008/0089330 A1    Apr. 17, 2008

(51) Int. Cl.
*H04L 12/28* (2006.01)
*H04L 12/50* (2006.01)
(52) U.S. Cl. .................. 370/254; 370/400
(58) Field of Classification Search .......... 370/390, 370/401, 248
See application file for complete search history.

(56) References Cited

U.S. PATENT DOCUMENTS

| | | | |
|---|---|---|---|
| 6,216,169 B1* | 4/2001 | Booman et al. | 709/246 |
| 2005/0105475 A1* | 5/2005 | Norrgard et al. | 370/254 |
| 2007/0177518 A1* | 8/2007 | Li et al. | 370/252 |
| 2007/0226630 A1* | 9/2007 | Farid et al. | 715/734 |
| 2008/0316914 A1* | 12/2008 | Vercellone et al. | 370/216 |

OTHER PUBLICATIONS

Pepelnjak et al. "MPLS and VPN Architecture", 2002, Indianapolis, IN: Cisco Press, CCIP ed., Chapter 17.*

* cited by examiner

*Primary Examiner* — Chirag G Shah
*Assistant Examiner* — Jenkey Van
(74) *Attorney, Agent, or Firm* — Patterson & Sheridan, LLP

(57) ABSTRACT

Techniques and apparatus that allow for accurate determination of network topology utilizing multicast groups are provided. A multicast group may be established that contains a set of VPN endpoints to be monitored. By sending ping packets from each provider edge endpoint to the multicast group, ping responses (with unicast addresses for responders) may be collected and analyzed to determine reachability of the endpoints.

15 Claims, 7 Drawing Sheets

CONNECTIVITY OUTAGE DETECTION BASED ON A MULTICAST MANAGEMENT MPLS-VPN GROUP

BACKGROUND OF THE INVENTION

1. Field of the Invention

The present disclosure relates generally to network management.

2. Description of the Related Art

Network services have changed dramatically in recent years, particularly with the migration of sensitive data from the confines of company Intranets to provider networks that carry data for multiple customers over a single network core. For example, voice, video, and other business data, is now commonly sent over virtual private networks (VPNs) established over service provider core networks. Such VPNs provide security and separation by preventing the communication of data between sites that are not part of the same VPN.

As business entities come to rely more and more on service provider core networks, Service Level Agreements play an increasingly important role in their relationship with service providers. SLAs typically contain provisions that specify a guaranteed level of service and penalty provisions for not meeting the specified level of service. In order to measure level of service, tools have been developed that provide information about network traffic that allows network performance to be monitored and also provides insight into the network that aids providers in providing reliable service.

One such tool, commonly referred to as a network probe, actively generates and monitors network traffic to gather information indicative of network performance. Network probes may be implemented on existing network devices, such as routers and switches, or in dedicated devices, such as a dedicated router to offload the required processing. In either case, by actively generating traffic that specifically targets devices in a given network path, network probes may enable the detection of network deficiencies that might not be found using non-intrusive techniques.

Results of probe operations may be kept internally by the device in which the probe is implemented and accessed, for example, via the device command line interface. Results may also be exposed to network management applications, for example, via the simple network management protocol (SNMP). Network probes may be configured to send a notification (commonly referred to as a trap) to a network management system (or fault manager) upon detection of a significant event, such as a loss in connectivity or the reduction in service level below a specified threshold amount. A trap may alert an operator or an administrator the traffic data transport has degraded or failed, indicating a network problem, such as malfunctioning or failing equipment and congestion.

For optimal placement of probes (i.e., what source-destination pairs should be monitored), some knowledge of the VPN topology is required to determine where to optimally place probes. VPN topology is generally defined by the ability to communicate or reach different destinations from different sources (also referred to as "reachability"). Selective placement is important, for example, because it would be a waste of computing resources (e.g., router CPU and memory) to provision a probe to monitor traffic between endpoints that do not actually communicate between each other, such as sites that represent "spokes" that communicate with a common "hub" but not each other.

Particularly in Multiprotocol Label Switching (MPLS) networks, it may be extremely difficult to determine site reachability and, therefore, to discover VPN topology. Conventionally, reachability between MPLS VPN sites is discovered through complex analysis of VPN routing/forwarding instance (VRF). For example, potential reachability may be established between devices which have common imported and exported labeled routes. However, the existence of routemaps and their additional constraints may cause further complexity and uncertainty. As a result, a topology model generated by conventional discovery techniques involving VRF data analysis may be inaccurate.

Accordingly, what is needed is an improved technique for discovering network topology.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DESCRIPTION OF EXAMPLE EMBODIMENTS

Overview

Embodiments of the present invention generally provide techniques and apparatus for discovering network topology, such as VPN topology in an MPLS network.

One embodiment provides a method of determining topology of a private network established over a provider network. The method generally includes sending, from a first device in the provider network, a first ping request targeting devices in a private network that belong to a multicast group, sending, from a second device in the provider network, a second ping request targeting devices in a private network that belong to a multicast group; and determining information regarding connectivity of devices in the private network based on ping responses received as a result of the first and second ping requests.

Another embodiment provides a method of determining topology of a private network established over a provider network including provider edge routers. The method generally includes sending, from multiple provider edge routers, first ping requests targeting other provider edge routers that belong to a first multicast group, sending, from multiple provider edge routers, second ping requests targeting customer edge routers that belong to a second multicast group, and determining information regarding connectivity of the customer edge routers in the private network based on ping responses received as a result of the first and second ping requests.

Another embodiment provides a network device generally including an interface for establishing communication with a provider network and logic for sending ping requests targeting devices belonging to a multicast group and for receiving ping responses as a result of the ping requests.

Another embodiment provides a network device generally including interface means for establishing communication with a provider network and logic means for sending ping requests targeting devices belonging to a multicast group and for receiving ping responses as a result of the ping requests.

Another embodiment provides a network management system for managing a provider network The system generally includes discovery logic for discovering topology of a private network established over the provider network based on results received in response to ping messages sent from devices in the provider network that target a multicast address.

Embodiments of the present invention allow for accurate determination of network topology utilizing multicast groups. A multicast group may be established that contains a set of VPN endpoints to be monitored. By sending ping packets from each provider edge endpoint to the multicast group, ping responses (with unicast addresses for responders) may be collected and analyzed to determine reachability of the endpoints. As a result, accurate network topology information may be obtained from the network itself, thus avoiding the complication and inaccuracy of conventional topology discovery.

An Example of a Network Architecture

Figure 1:
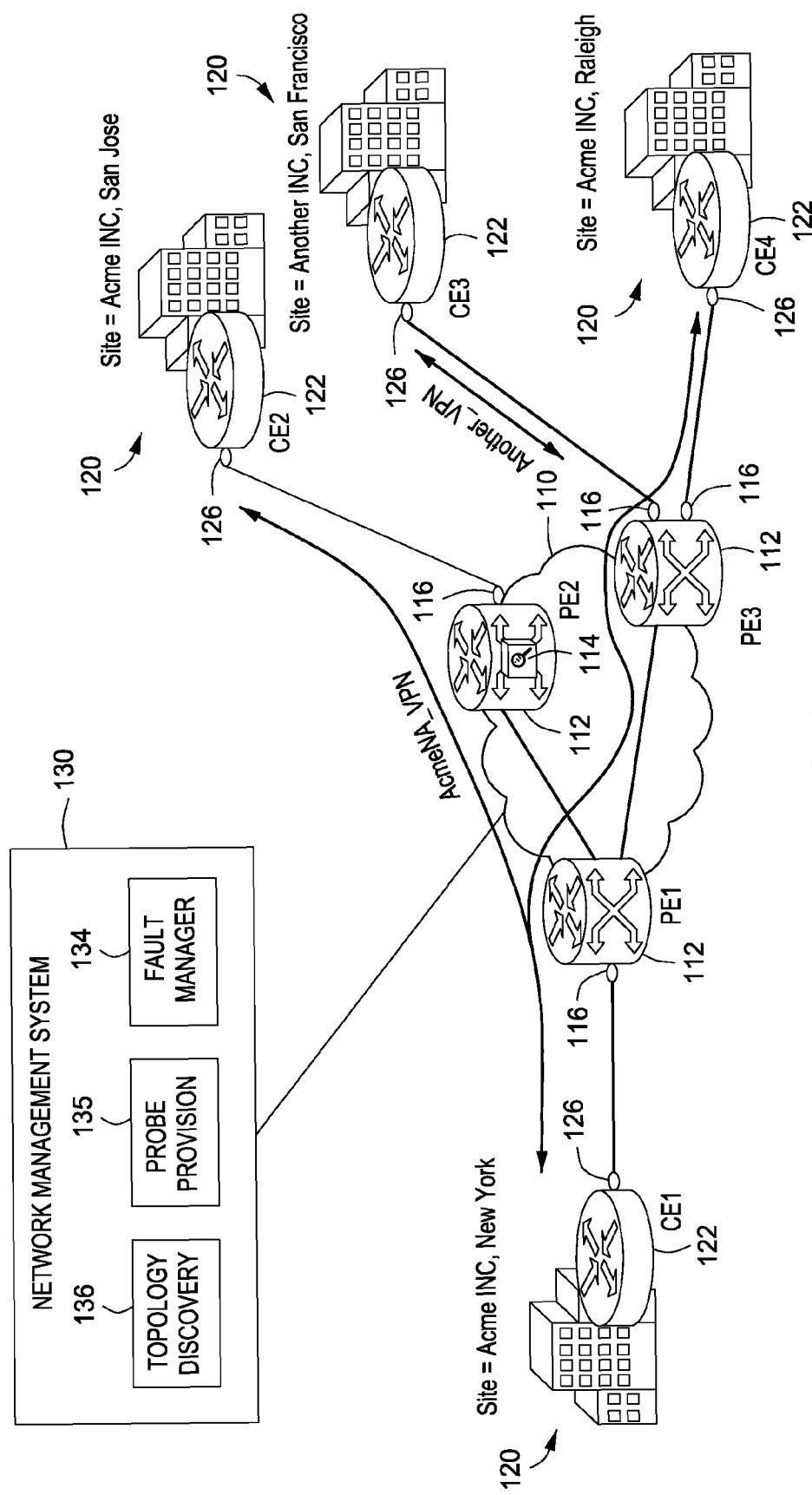
FIG. 1 illustrates an example of a network in accordance with embodiments of the present invention.

FIG. 1 illustrates one example of a network in which embodiments of the present invention may be utilized. The network generally includes a service provider network 110 that routes network traffic (e.g., of data, voice, and the like) between various customer sites 120. As illustrated, the customer sites 120 may connect to the service provider network 110 via access circuits 126 of customer edge (CE) routers 122 connected to access circuits 116 of provider edge (PE) routers 112 that are part of the provider network 110. While not shown, those skilled in the art will appreciate that the provider network 110 may also include a "fabric" of intermediate network devices, such as switches and routers that route and support traffic between the PE routers 112.

For some embodiments, the service provider network 110 may be a Multiprotocol Label Switching (MPLS) network that forwards internet protocol (IP) traffic using labels. These labels may instruct the routers and the switches in the provider network 110 where to forward packets as they are routed between PE routers 112 en route to CEs 122 at the customer sites 120 based on pre-established IP routing information.

The sites 120 may include sites from different business entities, as well as multiple sites from the same business entity (e.g., regional branch offices and headquarters). In the illustrated example, multiple sites (New York, San Jose, and Raleigh) for a first hypothetical business entity "Acme, Inc." and a single site (San Francisco) for a second hypothetical business entity "Another, Inc." are shown.

In order to provide secure communications between sites, virtual private networks (VPNs) may be established, for example when routing traffic between sites within the same business entity over the provider network 110. VPNs enable IP traffic to be routed securely over the provider network 110 by preventing the communication of data between sites that are not part of the same VPN. In FIG. 1, two VPNs are shown: a first VPN "AcmeNA_VPN" established between the three Acme sites and a second VPN "Another_VPN" established between the Another site and one or more other sites (not shown).

A network management system (NMS) 130 may be configured to monitor performance of the provider network 110, as traffic is exchanged over the VPNs. The NMS 130 may be implemented, for example, at a network operation center and may communicate with agents deployed in the provider network in an effort to help track network performance and the general health of network resources.

For example, the NMS 130 may communicate with a network probe 114 deployed in the network and configured to actively generate and monitor network traffic to gather information indicative of network performance. The network probe 114 may be implemented on an existing network device, such as a PE router 112, as shown, or in dedicated devices. The traffic generated may be designed to travel the same path as other traffic on various VPN connections. Thus, the connectivity of specific portions of a VPN routing and MPLS switching path, such as PE-to-PE connections and/or PE-to-CE connections, may be monitored.

Results of probe operations may be kept internally and accessed by the NMS 130 via polling, for example, using information about the device contained in a Management Information Base (MIB) Database. Alternatively, the probe 114 may be configured to automatically send a network trap (alarm) to the NMS 130, upon detection of a significant event, such as a loss in connectivity or the reduction in service level above or below specified threshold amount.

In order to decide where to optimally place probes (e.g., what source-destination pairs should be monitored), it may be beneficial to have some knowledge of the VPN topology. As previously described, a conventional approach to discovering VPN topology involves complex analysis of VPN routing/forwarding instances (VRFs), and may yield inaccurate results.

Utilizing Multicast Groups to Discover VPN Topology

Embodiments of the present invention, however, may make an accurate determination of network topology utilizing multicast groups. As illustrated in FIG. 1, the network management system 130 may include topology discovery logic 136 that analyzes responses to ping messages sent to multicast groups from the PE routers 112.

The topology discovery logic 136 may be configured to communicate with PE routers 112 to initiate ping requests that are sent from the PE routers 112 to VPN endpoints (CE or PE routers) that belong to multicast group. If a PE router 112 receives a ping response from a member of a multicast group being pinged, that member is, by definition, reachable from that PE router 112.

By examining collective ping responses received from ping messages sent from different directions (e.g., from different PE routers in the network), the network discovery logic 136 may determine which devices are "reachable" from which network endpoints and, from that information, infer information about the network topology. For some embodiments, the network management system may also include probe provision logic 135 configured to deploy probes based on the VPN topology determined by the topology discovery logic 136.

Figure 2:
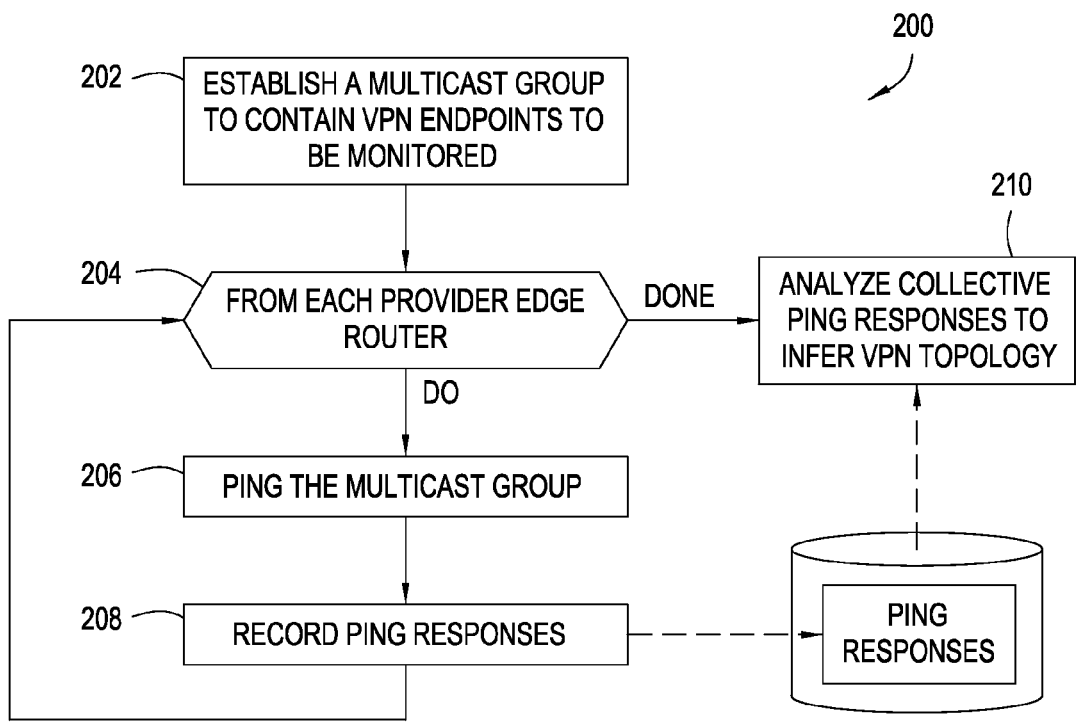
FIG. 2 is a flow diagram of an example of operations for network discovery in accordance with embodiments of the present invention.

FIG. 2 is a flow diagram of an example of operations 200 that illustrate utilizing multicast groups to discover network topology, in accordance with embodiments of the present invention. The operations 200 may be described with reference to FIGS. 3A-3C, which illustrate the example of a network shown in FIG. 1, during multicast group-based discovery operations shown in FIG. 2.

The operations 200 begin, at step 202, by establishing a multicast group. A multicast group may be established, for example, when a set of devices in the network join the group (e.g., utilizing an ICMP join) and "advertise" that they will receive messages with a common multicast group address. For some embodiments, when devices added to a VPN network (e.g., additional access circuits), they may join an appropriate multicast group if they are to be monitored. If they are not to be monitored, a network administrator may decide to keep the devices from joining the group. For some embodiments, the decision whether or not to join may be made as part of device configuration, for example, via a graphical user interface (GUI) or command line interface (CLI).

Figure 3A:
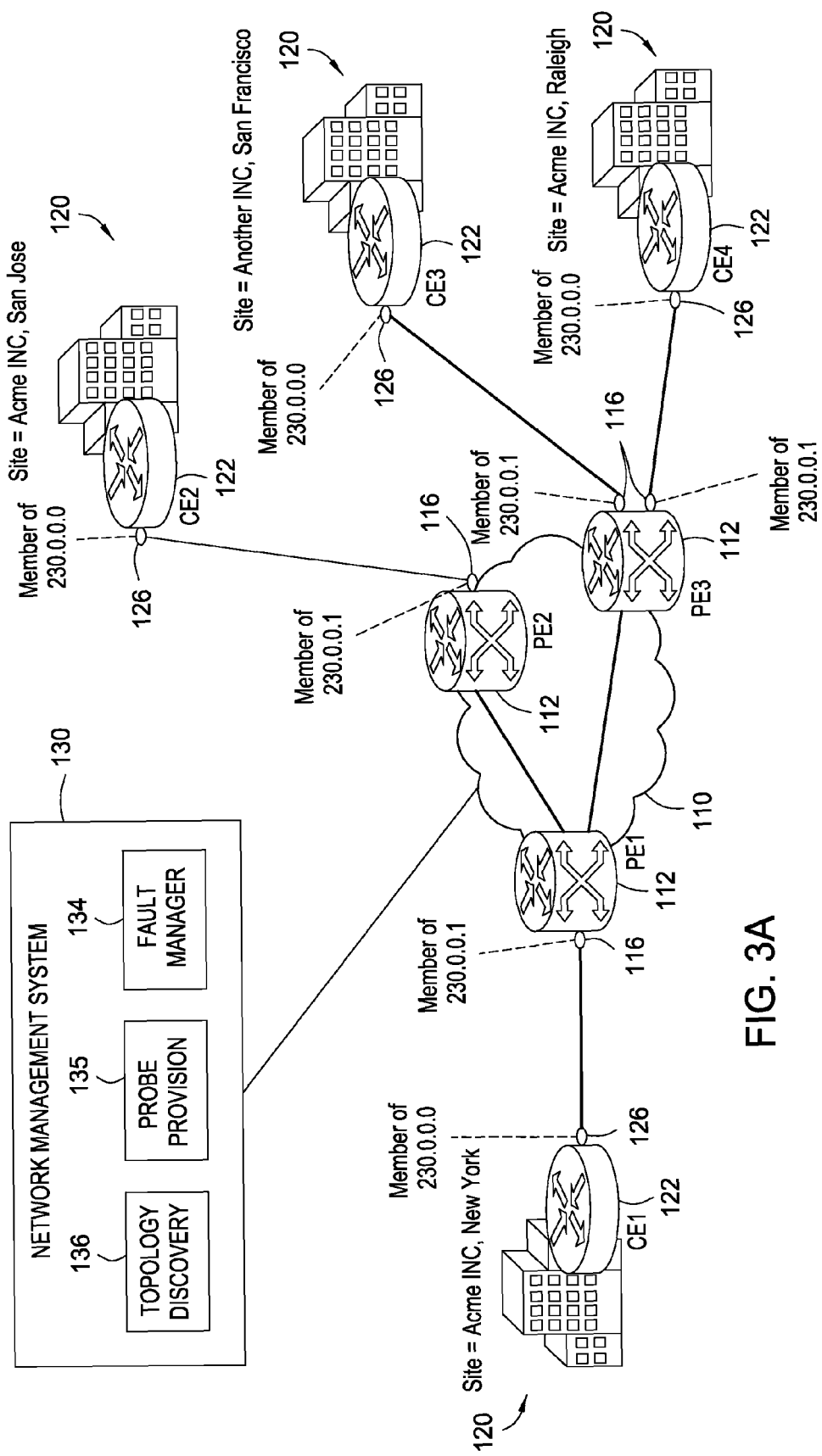
FIGS. 3A, 3B and 3C illustrate the example of a network shown in FIG. 1, during network topology discovery operations in accordance with embodiments of the present invention.

For some embodiments, multiple multicast groups may be established, with similar devices joining common groups. For example, as illustrated in FIG. 3A, a first multicast group may be established for PE routers 112 (illustratively shown with a multicast group address of 230.0.0.1), while a second multicast group may be established for CE routers 114 (illustratively shown with a multicast group address of 230.0.0.0).

At 204, a loop of operations 206-208 is entered, to be performed for each PE router 112. At step 206, a multicast group is pinged and, at step 208, ping responses (received from members of the pinged multicast group) are recorded. The operations 206-208 may be repeated until the multicast group is pinged from each PE router. Once the multicast group has been pinged from each PE router, the collective ping responses are analyzed, at step 210, to infer the network topology.

For some embodiments, ping responses received by PE routers 112 may be sent directly to the network management system 130. For other embodiments, ping responses may be collected at the PE routers 112, for example, and retrieved by the network management system 130 by polling.

Figure 3B:
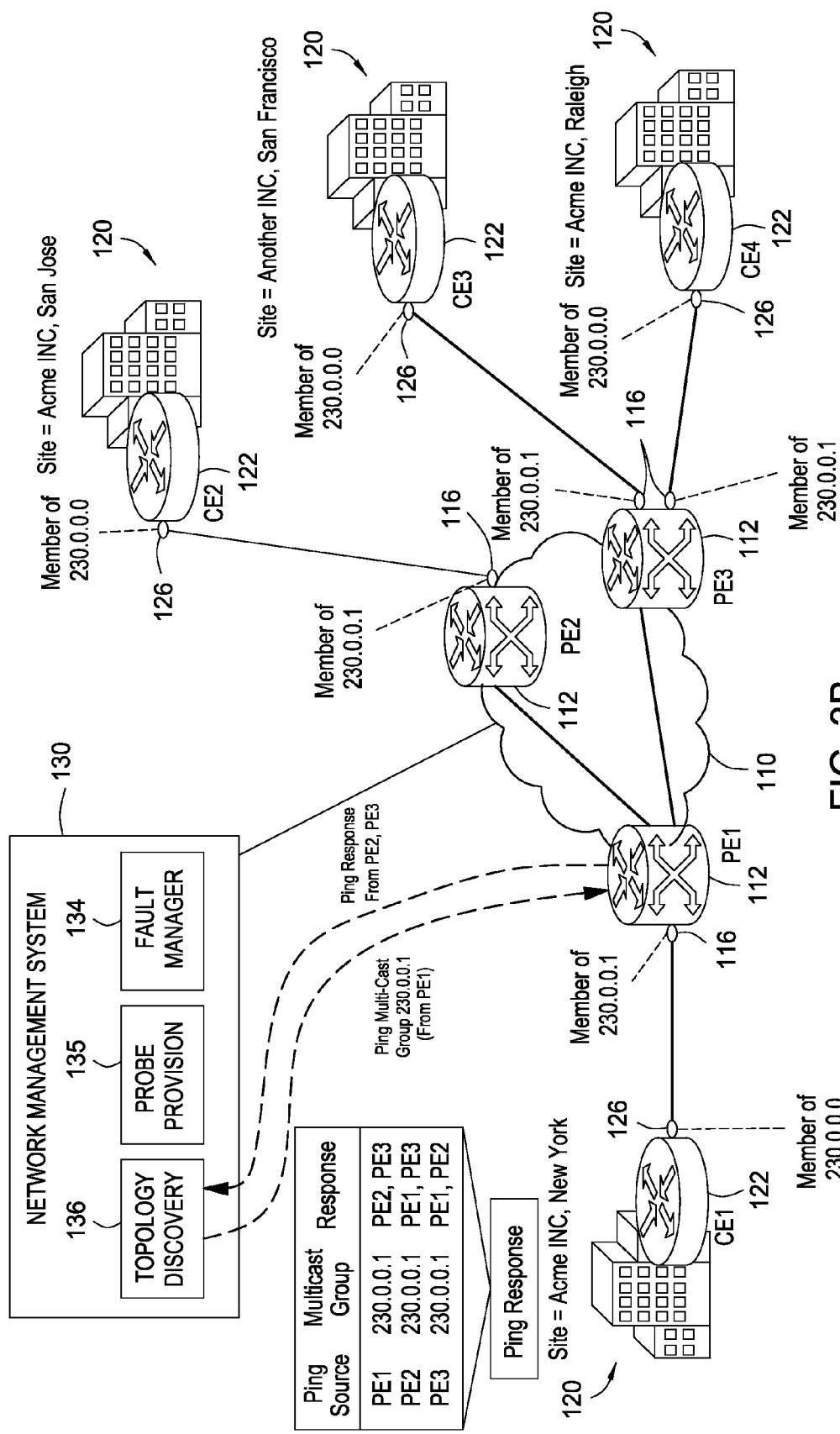

FIG. 3B illustrates how the connectivity of PE routers 112 may be inferred by pinging the PE multicast group (230.0.0.1). As illustrated, by sending ping requests targeting the PE multicast group from PE1, it may be discovered that PE2 and PE3 are reachable from PE1. In a similar manner by sending ping requests from PE2, it may be discovered that PE1 and PE3 are reachable from PE2, while by sending ping requests from PE3, it may be discovered that PE1 and PE2 are reachable from PE3.

Figure 3C:
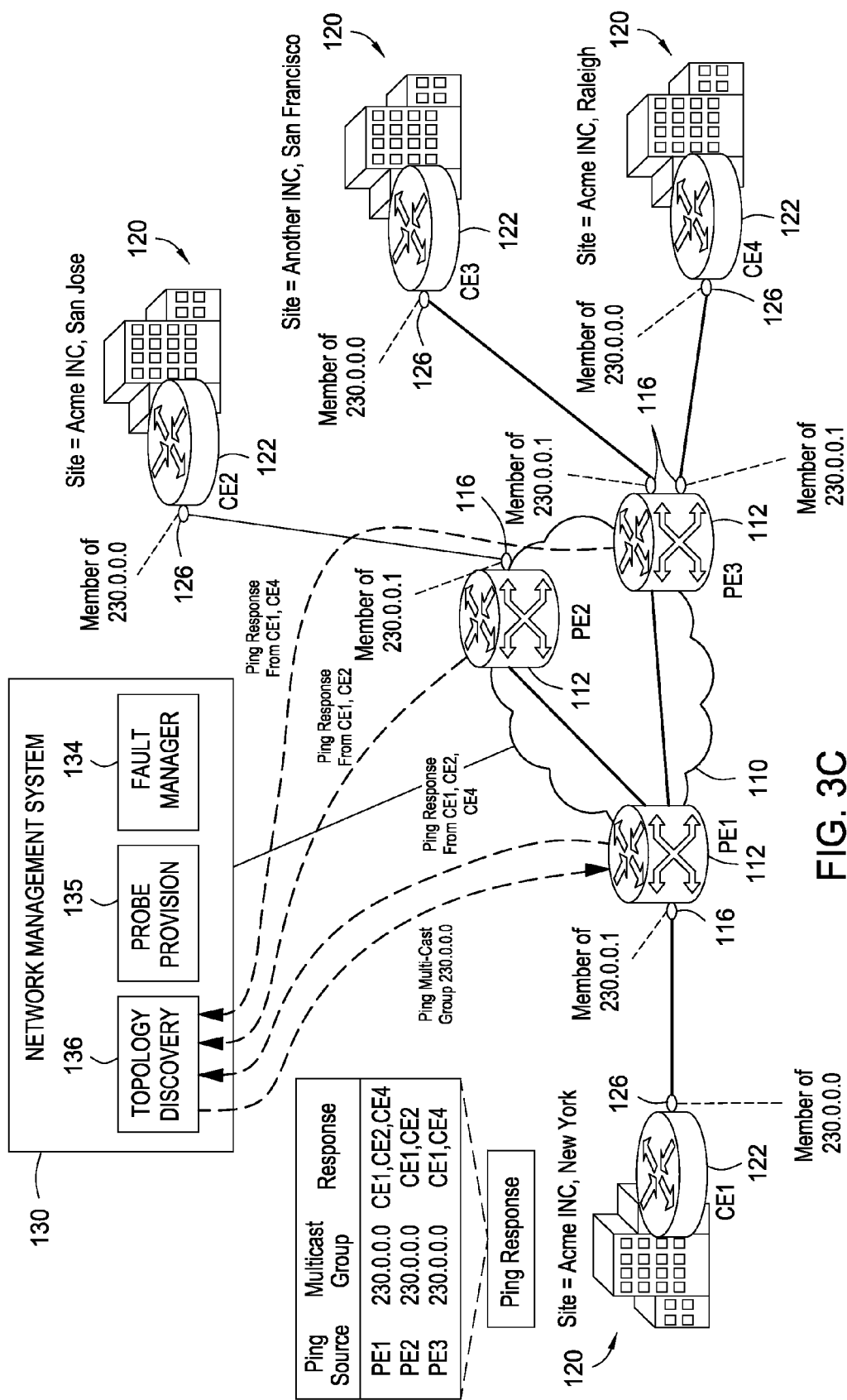

FIG. 3C illustrates how the connectivity of CE routers 114 may be inferred by pinging the CE multicast group (230.0.0.0) from the PE routers 112. As illustrated, by sending ping requests targeting the CE multicast group from PE1, it may be discovered that CE1, CE2, and CE4 are reachable from PE1. In a similar manner by sending ping requests from PE2, it may be discovered that CE1 and CE2 are reachable from PE2, while by sending ping requests from PE3, it may be discovered that CE1 and CE4 are reachable from PE3.

For some embodiments, the same multicast group addresses may be used in different VPN connections. For example, as illustrated, CE multicast groups in both Acme, Inc., and Another, Inc. VPN networks may have the same multicast address (e.g., 230.0.0.0). Sharing a multicast address across VPNs may be permissible, for example, because traffic routed in each VPN connection may utilize a different route distinguisher (RD) in combination with an IPv4 address. As a result, CE3 is not found when discovering the topology for the Acme VPN.

By analyzing the collective ping responses, received from the CE routers, the topology discovery logic 136 may infer that CE1 and CE2 are connected, that CE1 and CE4 are connected, but that CE2 and CE4 are not connected. As will be described in greater detail below, this insight into the VPN topology may allow probe provision logic 135 to strategically deploy network probes (e.g., to monitor traffic between CE1 and CE2, CE1 and CE4, but not between CE2 and CE4), thereby conserving resources.

The discovery operations 200 shown in FIG. 2 may be repeated periodically, for example, to update the discovered topology to account for network devices that have been added or removed from the network, as indicated by their joining or leaving a multicast group. For some embodiments, the discovery operations may be performed in response to a change in connectivity, for example, as indicated by a network alarm (trap) sent by a network probe.

Deploying Probes Based on Topology Discovered Using Multicast Groups

Figure 4:
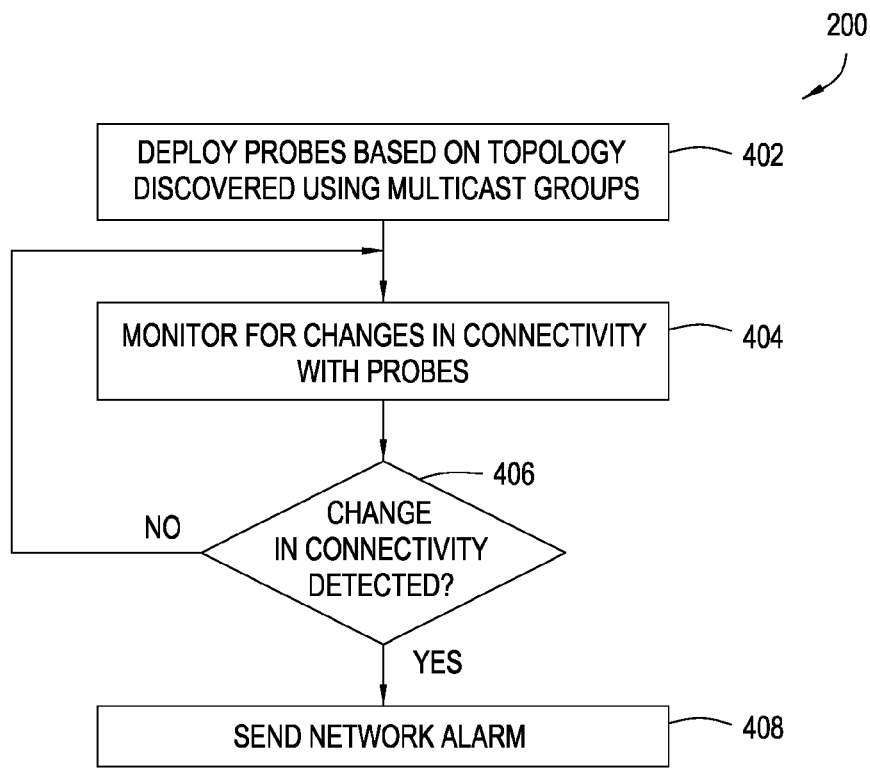
FIG. 4 is a flow diagram of an example of operations for deploying network probes in accordance with embodiments of the present invention.

FIG. 4 is a flow diagram of an example of operations 400 that illustrate deploying network probes based on the network topology inferred using multicast groups, in accordance with embodiments of the present invention. The operations 400 may be performed, for example, by the probe provision logic 135, and may be described with reference to FIGS. 5A and 5B, which illustrate the example of a network shown in FIG. 1, during probe provisioning and network monitoring using the operations shown in FIG. 4.

Figure 5A:
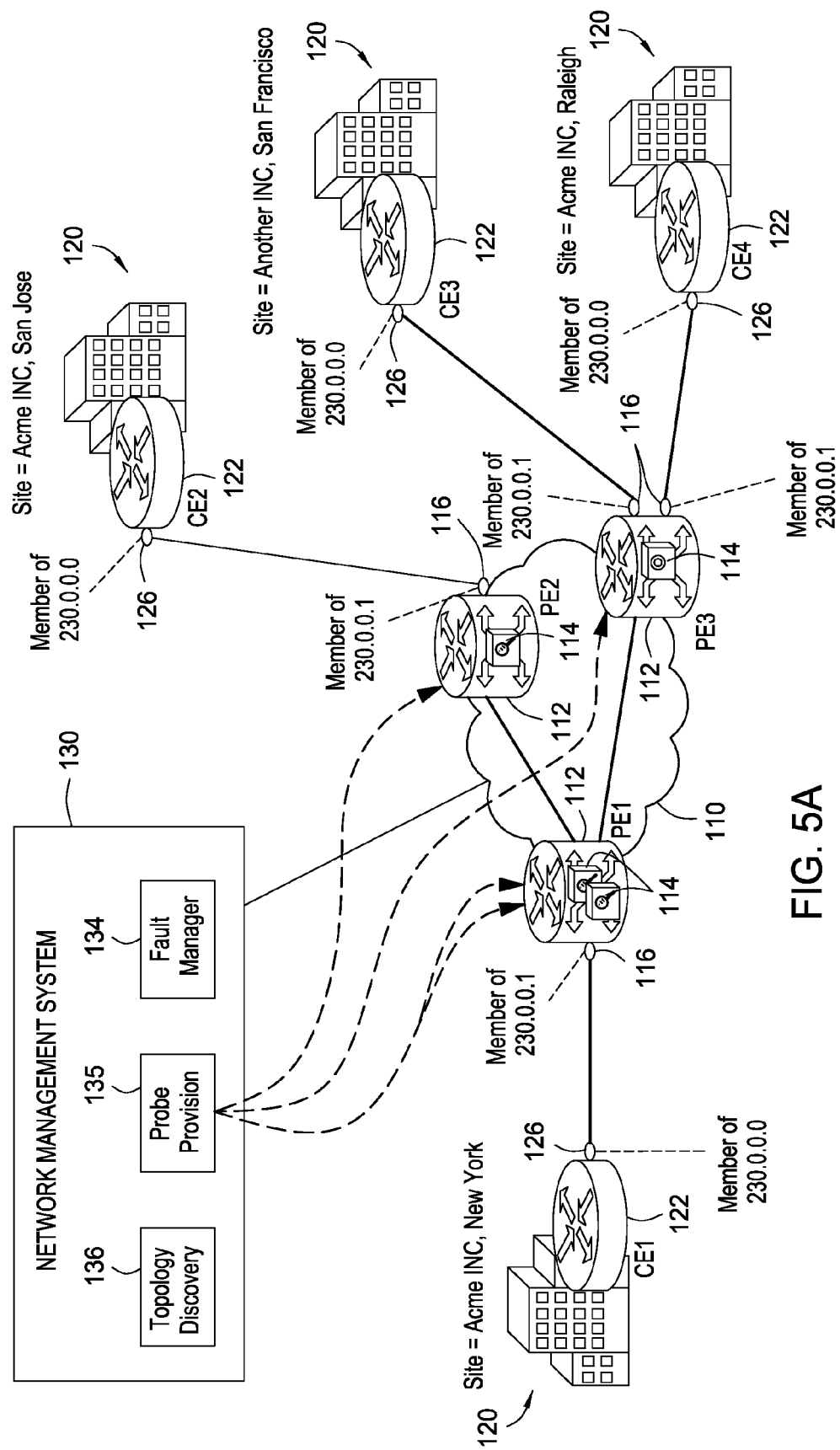
FIGS. 5A and 5B illustrate the example of a network shown in FIG. 1, with network probes deployed to monitor for loss of connectivity in accordance with embodiments of the present invention.

The operations 400 begin, at step 402, by deploying probes based on the topology discovered utilizing multicast groups. In the previously described discovery operations, it was determined that CE1 is connected to CE2. Therefore, as illustrated in FIG. 5A, a network probe 114 may be may be deployed in PE1 and PE2 to generate and monitor traffic routed between CE1 and CE2. Similarly, because it was determined that CE1 is connected to CE4, a network probe 114 may be may be deployed in PE1 and PE3 to generate and monitor traffic routed between CE1 and CE4. However, because it was determined that CE2 and CE4 are not connected, no network probe is deployed (in PE2 and PE3) to monitor traffic between CE2 and CE4.

The probes are used to monitor changes in connectivity, at step 404, for example, by actively generating traffic targeting the monitored destination. If a change in connectivity is detected, as determined in step 406, a network alarm may be sent, at step 408.

Figure 5B:
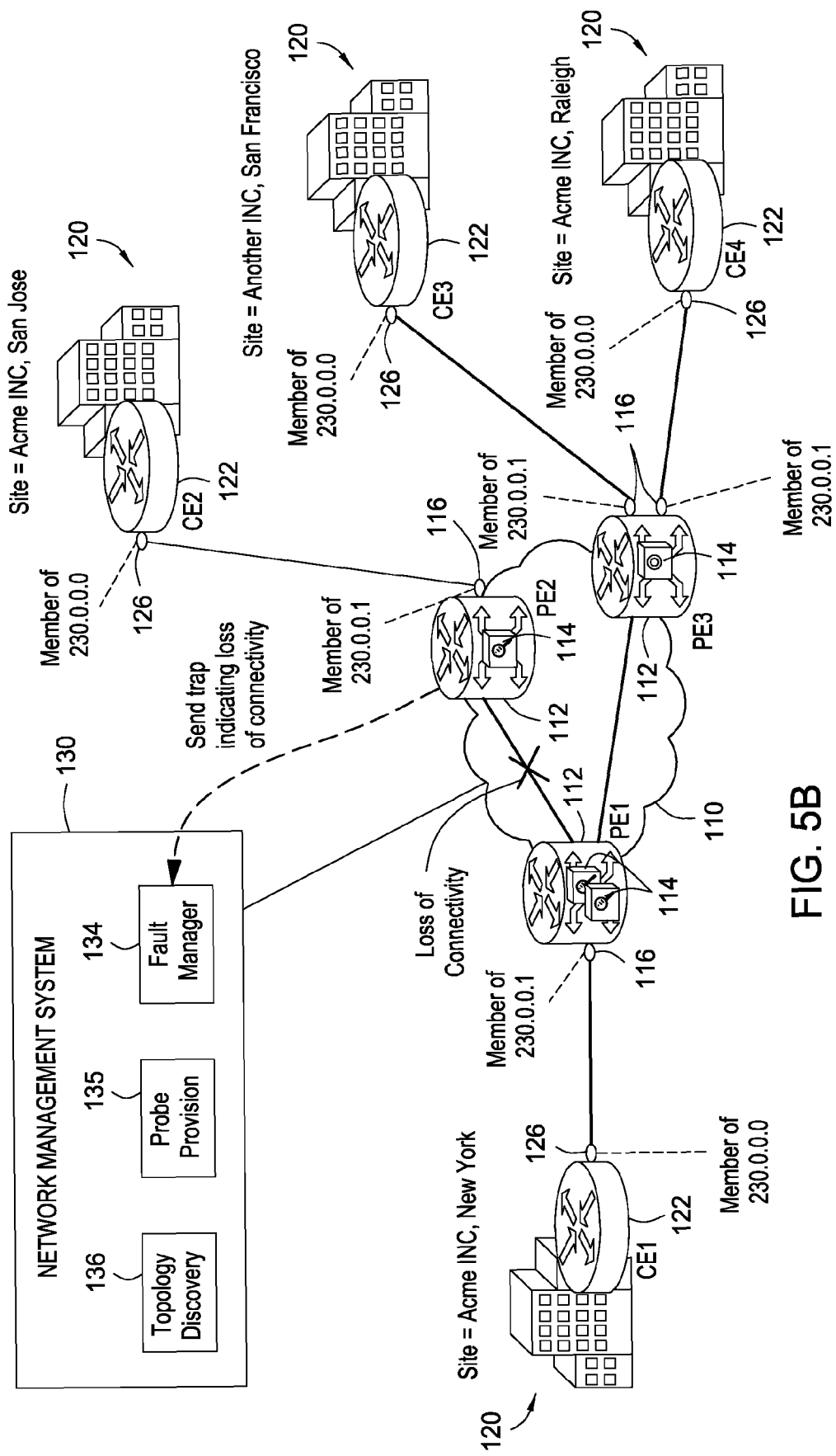

For example, as illustrated in FIG. 5B, a probe 114 deployed in PE2 to monitor traffic between CE1 and CE2 may detect a loss in connectivity somewhere between CE1 and CE2 (between PE1 and PE2 in the illustration). In response to detecting the loss in connectivity, the probe 114 may send a network alarm to the fault manager 134. The fault manager may take any number of actions, for example, such as generating an alarm screen to notify a user (administrator) of the alarm condition. As previously described, in response to the detected change in connectivity, network discovery operations may be repeated to update the topology.

For some embodiments, in the event of a loss of connectivity, NMS130 may analyze collective ping responses (received at various PEs) in an effort to determine the location and/or nature of the loss.

As an example, the location of the loss of connectivity shown in FIG. 5B may be deduced as follows. By sending ping requests targeting the CE multicast group (230.0.0.0) from PE1, responses may be received from CE1, but not CE2, indicating the loss of connectivity is not between PE1 and CE1, but rather somewhere between PE1 and CE2. The specific location of the loss of connectivity may then be inferred a number of ways.

For example, because the network alarm was generated by a network probe in PE2, monitoring traffic sent to CE1, it may be deduced that the loss in connectivity is between PE2 and PE1. As an alternative, by sending ping requests targeting the CE multicast group (230.0.0.0) from PE2, responses may be received from CE2, but not CE1, thereby indicating the loss of connectivity is not between PE2 and CE2, but rather somewhere between PE2 and CE1. In a similar manner, by sending ping requests targeting the PE multicast group (230.0.0.1) from PE2, a lack of response from PE1 might indicate the loss in connectivity is between PE1 and PE2.

CONCLUSION

While the foregoing is directed to embodiments of the present invention, other and further embodiments of the invention may be devised without departing from the basic scope thereof, and the scope thereof is determined by the claims that follow.

What is claimed is:

1. A method, comprising:
   sending, from a first provider edge (PE) router in a provider network, a first ping request targeting at least one first device in a virtual private network (VPN) that belongs to a multicast group;
   sending, from a second PE router in the provider network, a second ping request targeting at least one second device in the VPN that belongs to the multicast group;
   determining whether the at least one first device in the VPN is connected to the at least one second device in the VPN based on ping responses received as a result of the first and second ping requests, wherein the determining indicates that the second device is connected to the first device and is not connected to a third device in the VPN; and
   deploying one or more network probes in the VPN based on the determining, such that a network probe is deployed to monitor traffic between the first device and the second device in the VPN, and such that no network probe is deployed to monitor traffic between the second device and the third device in the VPN.

2. The method of claim 1, wherein at least one device belonging to the multicast group is outside the provider network.

3. The method of claim 2, wherein at least one device belonging to the multicast group is a customer edge (CE) router.

4. The method of claim 1, further comprising repeating sending the first and second ping requests to monitor for changes in network topology.

5. A method, comprising:
   sending, from multiple provider edge (PE) routers in a provider network, first ping requests targeting other PE routers in the provider network that are involved in a virtual private network (VPN) and belong to a first multicast group;
   sending, from multiple PE routers in the provider network, second ping requests targeting devices in a customer network that are involved in the VPN and that belong to a second multicast group;
   determining information regarding connectivity between at least one first device and at least one second device in the customer network involved in the VPN, based on ping responses received as a result of the first and second ping requests, wherein the determined information indicates that the at least one second device is connected to the at least one first device and is not connected to at least one third device in the VPN; and
   deploying one or more network probes based on the determined information, such that a network probe is deployed to monitor traffic between the at least one first device and the at least one second device in the VPN, and such that no network probe is deployed to monitor traffic between the at least one second device and the at least one third device in the VPN.

6. The method of claim 5, further comprising:
   detecting a change in connectivity between devices involved in the VPN;
   sending third ping requests targeting at least one of the first multicast group and the second multicast group; and
   determining information about the loss of connectivity based on ping responses received as a result of the third ping requests.

7. The method of claim 5, further comprising:
   sending, from multiple PE routers in the provider network, third ping requests targeting devices in the customer network that belong to a third multicast group; and
   wherein the devices in the customer network that belong to the second multicast group and the devices in the customer network that belong to the third multicast group are part of different VPNs.

8. The method of claim 7, wherein the second and third multicast groups share a common multicast address.

9. A system, comprising:
   interface logic in communication with a provider network for receiving ping results received in response to ping messages sent from edge routers in a virtual private network (VPN) that target a multicast address of a multicast group to which devices in the VPN belong;
   discovery logic for determining a topology of the VPN based on the received ping results, wherein the determining indicates that a first device is connected to a second device in the VPN and that the second device is not connected to a third device in the VPN; and
   probe provision logic configured to deploy one or more probes to monitor traffic in the VPN, based on the topology of the VPN discovered by the discovery logic and by operation of one or more computer processors, such that a network probe is deployed to monitor traffic between the first device and the second device in the VPN, and such that no network probe is deployed to monitor traffic between the second device and the third device in the VPN.

10. The system of claim 9, wherein the discovery logic is configured to initiate the sending of ping requests from provider edge (PE) routers of the provider network that target devices in a customer network belonging to the multicast address.

11. The system of claim 9, further comprising:
    logic configured to determine the location of a detected loss of connectivity by analyzing results received in response to ping messages sent from edge routers in the provider network that target a multicast address.

12. A method, comprising:
    receiving ping results received in response to ping messages sent from edge routers in a virtual private network (VPN) that target a multicast address of a multicast group to which devices in the VPN belong;

determining a topology of the VPN based on the received ping results, wherein the determining indicates that a first device is connected to a second device in the VPN and that the second device is not connected to a third device in the VPN; and deploying one or more probes to monitor traffic in the VPN, based on the topology of the VPN discovered by the discovery logic, such that a network probe is deployed to monitor traffic between the first device and the second device in the VPN, and such that no network probe is deployed to monitor traffic between the second device and the third device in the VPN.

13. The method of claim 12, further comprising:

initiating the sending of ping requests from provider edge (PE) routers of a provider network that target devices in a customer network belonging to the multicast address.

14. The method of claim 12, further comprising:

determining the location of a detected loss of connectivity by analyzing results received in response to ping messages sent from provider edge (PE) routers in a provider network that target the multicast address.

15. A system, comprising:

means for receiving ping results received in response to ping messages sent from edge routers in a virtual private network (VPN) that target a multicast address of a multicast group to which devices in the VPN belong;

means for determining a topology of the VPN based on the received ping results, wherein the determining indicates that a first device is connected to a second device in the VPN and that the second device is not connected to a third device in the VPN; and means for deploying one or more network probes based on the topology of the VPN, such that a network probe is deployed to monitor traffic between the first device and the second device in the VPN, and such that no network probe is deployed to monitor traffic between the second device and the third device in the VPN.

* * * * *